(12) United States Patent  
Gulsun et al.

(10) Patent No.: US 11,410,308 B2
(45) Date of Patent: Aug. 9, 2022

(54) 3D VESSEL CENTERLINE RECONSTRUCTION FROM 2D MEDICAL IMAGES

(71) Applicant: Siemens Healthcare GmbH, Erlangen (DE)

(72) Inventors: Mehmet Akif Gulsun, Princeton, NJ (US); Martin Berger, Bubenreuth (DE); Tiziano Passerini, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 17/594,314

(22) PCT Filed: Jul. 17, 2019

(86) PCT No.: PCT/EP2019/069176
§ 371 (c)(1),
(2) Date: Oct. 11, 2021

(87) PCT Pub. No.: WO2021/008697
PCT Pub. Date: Jan. 21, 2021

(65) Prior Publication Data
US 2022/0164953 A1 May 26, 2022

(51) Int. Cl.
*G06T 7/00* (2017.01)
*G06V 10/24* (2022.01)
(Continued)

(52) U.S. Cl.
CPC ............ *G06T 7/0012* (2013.01); *G06V 10/24* (2022.01); *G06V 10/776* (2022.01); *G06V 10/82* (2022.01);
(Continued)

(58) Field of Classification Search
CPC ......... G06T 7/0012; G06T 2207/10116; G06T 2207/20081; G06T 2207/20084;
(Continued)

(56) References Cited

U.S. PATENT DOCUMENTS 9,349,178 B1 * 5/2016 Itu ......................... G06V 10/42
9,918,690 B2 * 3/2018 Itu ........................... G06T 7/11
(Continued)

FOREIGN PATENT DOCUMENTS

WO WO2020030331 A1 2/2020

OTHER PUBLICATIONS

Zhang et al: "Deep Reinforcement Learning for Vessel Centerline Tracing in Multi-modality 3D Volumes"; Sep. 13, 2018; International Conference on Financial Cryptography and Data Security; [Lecture Notes in Computer Science]; Springer; Berlin, Heidelberg; 2018; pp. 755-763; (Year: 2018).*
(Continued)

*Primary Examiner* — Van D Huynh

(57) ABSTRACT

Systems and methods for determining a 3D centerline of a vessel are provided. A current state observation of an artificial agent is determined based on one or more image view sets, each including 2D medical images of a vessel, a current position of the artificial agent in the 2D medical images, and a start position and a target position in the 2D medical images. Policy values are calculated for a plurality of actions for moving the artificial agent in 3D based on the current state observation using a trained machine learning model. The artificial agent is moved according to a particular action based on the policy values. The steps of determining, calculating, and moving are repeated for a plurality of iterations to move the artificial agent along a 3D path between the start position and the target position. The 3D centerline of the vessel is determined as the 3D path.

20 Claims, 6 Drawing Sheets

(51) Int. Cl.
*G06V 10/82* (2022.01)
*G06V 10/776* (2022.01)

(52) U.S. Cl.
CPC ............... *G06T 2207/10116* (2013.01); *G06T 2207/20081* (2013.01); *G06T 2207/20084* (2013.01); *G06T 2207/30101* (2013.01)

(58) Field of Classification Search
CPC . G06T 2207/30101; G06T 2207/30172; G06T 7/11; G06T 7/181; G06T 7/70; G06T 7/174; G06V 10/24; G06V 10/776; G06V 10/82
USPC .......................................................... 382/128
See application file for complete search history.

(56) References Cited

U.S. PATENT DOCUMENTS

| | | | | |
|---|---|---|---|---|
| 2016/0148371 | A1* | 5/2016 | Itu ..................... | G06K 9/6201 382/128 |
| 2016/0148372 | A1* | 5/2016 | Itu ..................... | A61B 8/5223 382/128 |
| 2017/0258433 | A1* | 9/2017 | Gulsun ............... | A61B 6/5217 |
| 2017/0262733 | A1* | 9/2017 | Gulsun ............... | G06V 10/454 |
| 2017/0262981 | A1* | 9/2017 | Gulsun ............... | G06K 9/6256 |
| 2017/0372475 | A1* | 12/2017 | Gulsun ............... | G06T 7/0012 |
| 2018/0005083 | A1* | 1/2018 | Georgescu ........... | G06V 10/82 |
| 2020/0311485 | A1* | 10/2020 | Wang .................. | G06N 3/0454 |

OTHER PUBLICATIONS

Man et al: "Deep Q Learning Driven CT Pancreas Segmentation with Geometry-Aware U-Net"; arxiv.org; Cornell University Library, 201 Olin Library Cornell University Ithaca, NY14853; Apr. 19, 2019 (Year: 2019).*

Gulsun et al., "Coronary Centerline Extraction via Optimal Flow Paths and CNN Path Pruning", MICCAI, 2016, pp. 317-325.

Itu et al., "Non-Invasive Assessment of Patient-Specific Aortic Haemodynamics from Four-Dimensional Flow MRI Data", Interface Focus 8: 20170006, 2018, 13 pgs.

Iturcea et al., "Artificial Intelligence for Real Time Estimation of Contrast Agent Velocity and Blood Flow Velocity in Coronary Angiograms"; Siemens AG Defensive Publication; 2019.

International Search Report dated Feb. 17, 2020 in International Patent Application No. PCT/EP2019/069176.

Man et al: "Deep Q Learning Driven CT Pancreas Segmentation with Geometry-Aware U-Net"; arxiv.org Cornell University Library, 201 Olin Library Cornell University Ithaca, NY 14853; Apr. 19, 2019.

Zhang et al: "Deep Reinforcement Learning for Vessel Centerline Tracing in Multi-modality 3D Volumes"; Sep. 13, 2018; International Conference on Financialcryptography and Data Security; [Lecture Notes in Computer Science]; Springer; Berlin, Heidelberg; 2018; pp. 755-763.

* cited by examiner

3D VESSEL CENTERLINE RECONSTRUCTION FROM 2D MEDICAL IMAGES

CROSS REFERENCE TO RELATED APPLICATIONS

This application is a national phase filing under 35 U.S.C. § 371 of International Patent Application No. PCT/EP2019/069176, filed Jul. 17, 2019, which is incorporated herein by reference in its entirety.

TECHNICAL FIELD

The present invention relates generally to 3D vessel centerline reconstruction, and more particularly to deep reinforcement learning for 3D vessel centerline reconstruction from 2D angiographic medical images.

BACKGROUND

Detection of blood vessels in medical images facilitates the diagnosis, treatment, and monitoring of many vascular diseases. An important step in vessel detection is centerline tracing to extract a centerline representation of the vessels for enabling specific visualizations or quantitative assessments of the vessels. Conventional methods for centerline tracing are not well adapted for two-dimensional medical images, such as, e.g., x-ray angiographic medical images. One conventional method for centerline tracing computes centerline paths by minimizing a cost such as medialness or vesselness. Another conventional method for centerline tracing uses flow based tracing based on estimated orientation tensors. However, such conventional methods for centerline tracing are not able to distinguish between bifurcated vessels and overlapping vessels in two-dimensional medical images. In addition, three-dimensional centerline reconstruction from two-dimensional medical images is a major challenge, particularly when the number of two-dimensional medical images is limited.

BRIEF SUMMARY OF THE INVENTION

In accordance with one or more embodiments, systems and methods for determining a 3D centerline of a vessel in one or more two dimensional (2D) medical images are provided. A current state observation of an artificial agent is determined based on one or more image view sets. Each of the one or more image view sets include one or more 2D medical images of a vessel, a current position of the artificial agent in the one or more 2D medical images, and a start position and a target position in the one or more 2D medical images. Policy values are calculated for a plurality of actions for moving the artificial agent in three dimensions (3D) based on the current state observation using a trained machine learning model. The artificial agent is moved according to a particular action based on the policy values. The steps of determining, calculating, and moving are repeated for a plurality of iterations to move the artificial agent along a 3D path between the start position and the target position. The 3D centerline of the vessel is determined as the 3D path. A 2D centerline of the vessel may be determined based on the 3D centerline of the vessel.

In one embodiment, the steps of determining, calculating, and moving are repeated until the current position of the artificial agent is the target position or a maximum number of iterations has been performed.

In one embodiment, the plurality of actions include discrete movements in a forward direction, a backward direction, a left direction, a right direction, an upwards direction, and a downwards direction. In one embodiment, the plurality of action comprises continuous movements in any direction. In one embodiment, policy values are calculated for the plurality of actions based on the current state observation using a trained deep neural network (DNN) trained using deep reinforcement learning.

In one embodiment, the one or more 2D medical images of the vessel are channels of an angiographic x-ray image. At least one of the one or more image view sets may include a vesselness image, an intensity image, one or more orientation images, branch overlapping scores, and/or key point detections. In one embodiment, the one or more image view sets is a single image view set that further includes a time of arrival of a contrast agent and blood flow velocity or contrast agent propagation speed.

In one embodiment, a proximal point and a plurality of respective distal points in a vessel tree are detected and the steps of determining the current state observation, calculating, moving, repeating, and determining the 3D centerline of the vessel are repeated for each proximal point-distal point pair using the proximal point as the start position and the respective distal point as the target position to determine a 3D centerline of the vessel tree.

These and other advantages of the invention will be apparent to those of ordinary skill in the art by reference to the following detailed description and the accompanying drawings.

DETAILED DESCRIPTION

The presented invention generally relates to methods and systems for three-dimensional (3D) vessel centerline reconstruction from two-dimensional (2D) medical images. Embodiments of the present invention are described herein to give a visual understanding of methods for 3D vessel centerline reconstruction from 2D medical images. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Further, it should be understood that while embodiments discussed herein may be discussed with respect to vessel centerline reconstruction from medical images, the present invention is not so limited. The present invention may be applied for the reconstruction of any tubular object of interest in images of any type.

Figure 1:
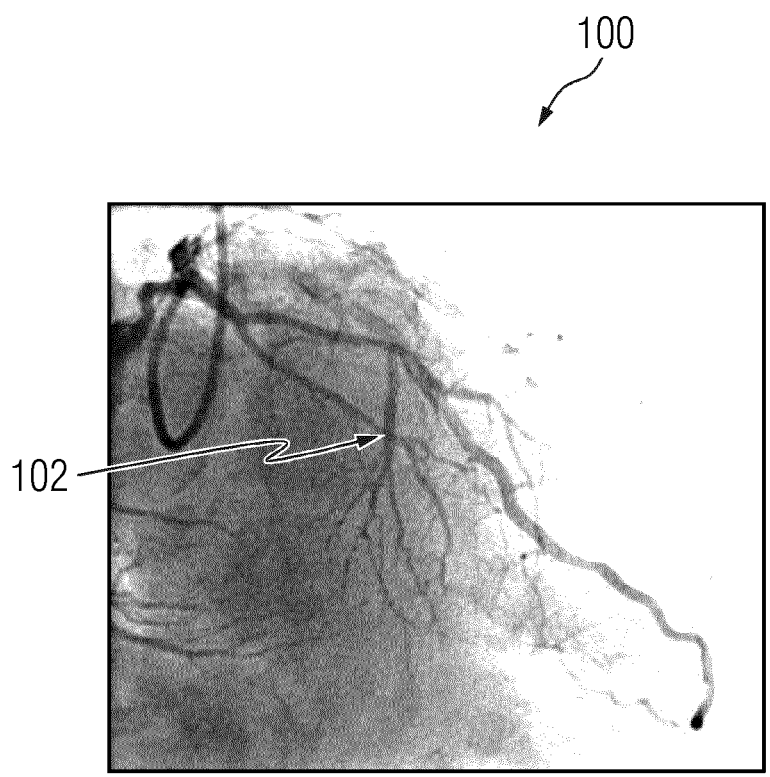
FIG. 1 shows an exemplary 2D x-ray medical image of a patient depicting braches of blood vessels.

FIG. 1 shows a 2D x-ray medical image 100 of a patient (or any other subject) depicting braches of blood vessels, including a region 102 of overlapping vessels. Medical image 100 may be acquired to facilitate a clinical examination of the patient, such as, e.g., an angiogram. To facilitate vessel detection and other imaging analysis tasks for such clinical examination, centerline tracing techniques may be applied to medical image 100 to extract a centerline representation of the branches of the blood vessels.

Conventional centerline tracing techniques are not able to distinguish between a bifurcation of a branch and an overlapping of branches at region 102. Accordingly, such conventional centerline tracing techniques may incorrectly interpret region 102 as a bifurcation of the branch of the vessel, thereby tracing a false shortcut path of the branch onto the overlapping branches. In addition, 3D centerline reconstruction from 2D medical images is a major challenge, particularly when the number of 2D medical images is limited.

Embodiments of the present invention apply deep reinforcement learning to train an intelligent artificial agent for determining a 3D centerline and/or a 2D centerline of a vessel from 2D medical images. The artificial agent is implemented using one or more computers (e.g., computer 602 of FIG. 6) by executing computer program instructions (code) loaded into memory. The artificial agent observes its environment (e.g., one or more image view sets comprising one or more 2D medical images, a current position of the artificial agent, and a start and target position) and autonomously moves within that environment to determine the 3D centerline of the vessel based on a policy learned using machine learning. The movement of the artificial agent is a virtual movement within a 3D space relative to a reference direction. The artificial agent can be triggered on demand, or be persistent and always running in the background. The input for the artificial agent (e.g., one or more image view sets) is used to determine its state. The output of the artificial agent is an "action" to move the artificial agent to form a 3D path representing the 3D centerline of the vessel. The 3D centerline of the vessel provides a better understanding of the structure of the vessel in the 2D medical image, particularly at regions of overlapping branches, such as, e.g., region 102. The 3D centerline of the vessel may be used for imaging analysis tasks with improved results.

Figure 2:
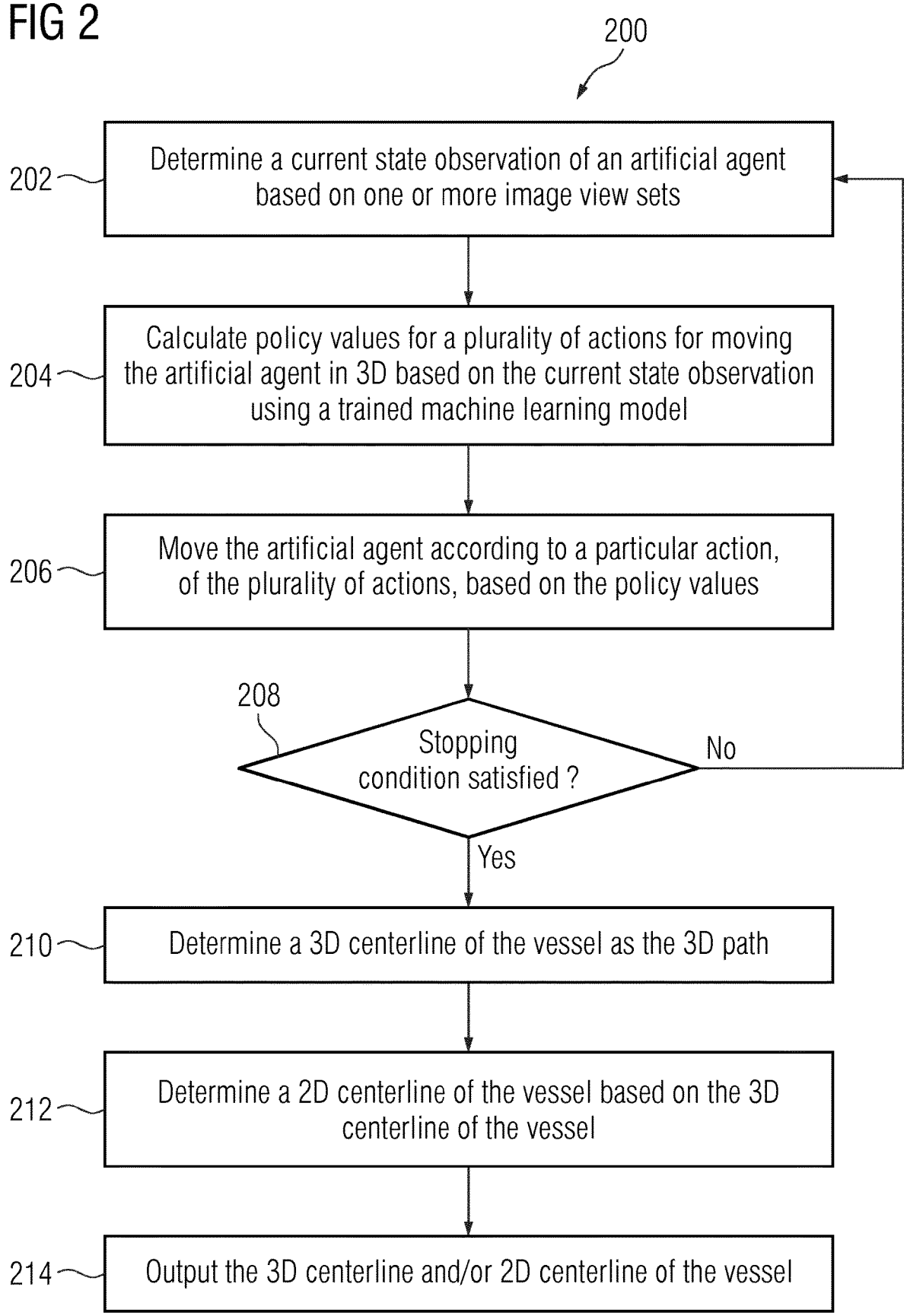
FIG. 2 shows a method for determining a 3D centerline of a vessel using an artificial agent.

FIG. 2 shows a method 200 for determining a 3D centerline of a vessel using an artificial agent, in accordance with one or more embodiments. Method 200 may be performed by any suitable computing device, such as, e.g., computer 602 of FIG. 6. Method 200 of FIG. 2 will be simultaneously described with reference to FIG. 3, which shows a high-level framework 300 for determining a 3D centerline of a vessel using an artificial agent, in accordance with one or more embodiments. The artificial agent may be trained during a prior training or offline stage, described in further detail below with respect to FIG. 5.

Figure 3:
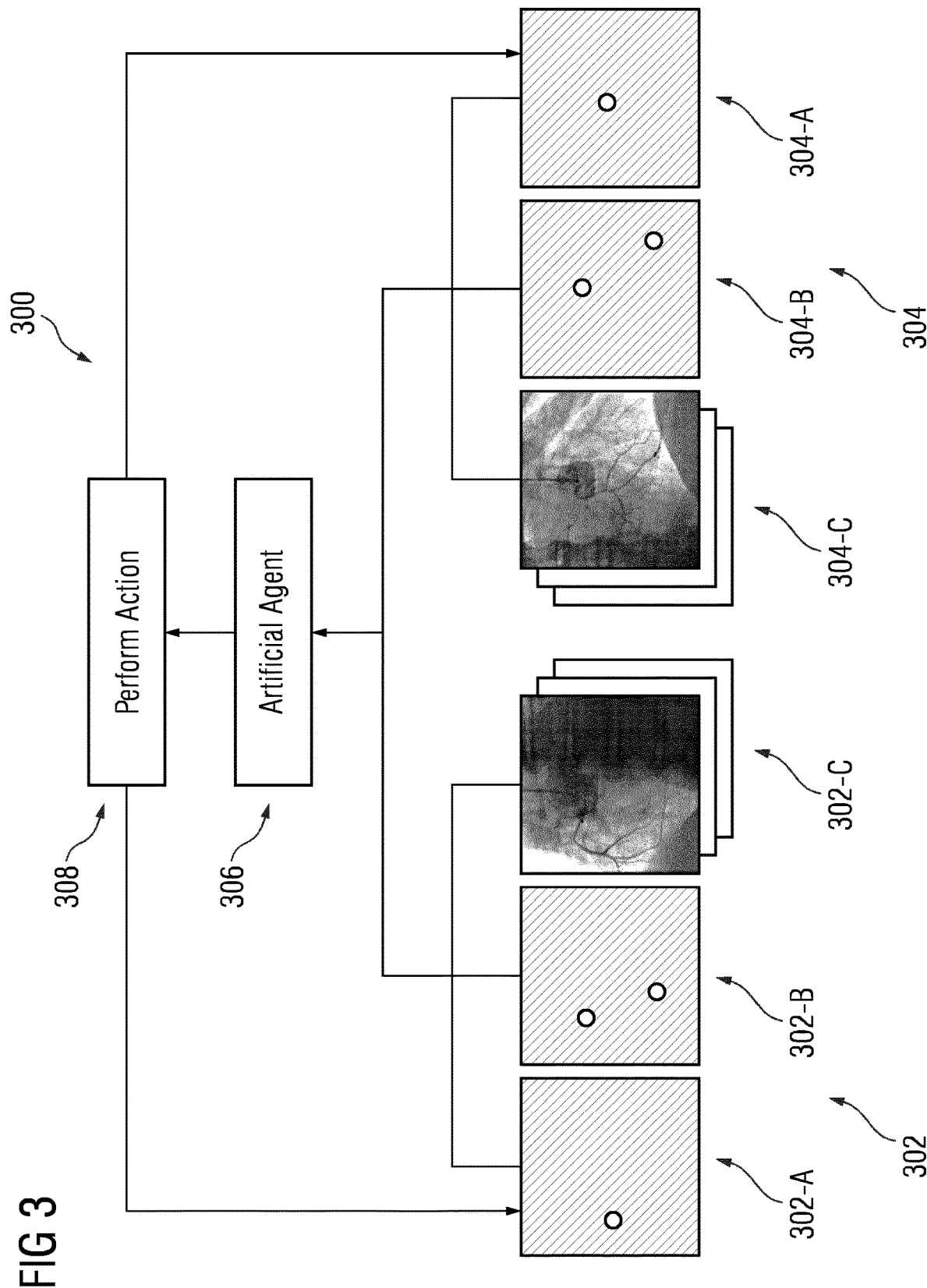
FIG. 3 shows a high-level framework for determining a 3D centerline of a vessel using an artificial agent.

At step 202, a current state observation of an artificial agent is determined based on one or more image view sets. Each of the one or more image view sets include one or more 2D medical images of a vessel, a current position of the artificial agent in the one or more 2D medical images, and a start position and a target position in the one or more 2D medical images. Framework 300 of FIG. 3 shows a first image view set 302 and a second image view set 304 relating to different views of the vessel. First image view set 302 and second image view set 304 respectively include one or more medical images 302-C and 304-C, a heatmap 302-B and 304-B indicating a start position and a target position in the one or more medical images 302-C and 304-C, and a heatmap 302-A and 304-A indicating a current position of the artificial agent in the one or more medical images 302-C and 304-C. While framework 300 is shown with first image view set 302 and second image view set 304, it should be understood that framework 300 may employ any number of image view sets.

In one embodiment, the one or more 2D medical images are channels of an x-ray angiography image. However, it should be understood that the one or more 2D medical images may be of any suitable modality, such as, e.g., magnetic resonance imaging (MRI), computed tomography (CT), dynaCT, ultrasound (US), or any other suitable domain or combination of domains. The one or more 2D medical images for each image view set may be of the same or different modalities and may be acquired from the same patient temporally acquired at different times or acquired from different patients. The one or more 2D medical images may be received directly from image acquisition devices, such as a CT scanner, MRI scanner, ultrasound device, C-arm image acquisition device, etc., or may be received by loading previously stored medical images from a memory or storage of a computer system or receiving the medical images in an electronic transmission from another computer system.

The start position and target position are locations on the vessel between which a centerline of the vessel is to be traced. The start position and the target position may be defined manually by a user or detected automatically, e.g., using deep learning methods. For example, the start position may be detected by automatically detecting a position of a catheter tip or ostium and the target position may be automatically detected by automatically detecting vessel distal points. The current position of the artificial agent 306 may also be defined manually by a user or detected automatically, e.g., based on the forward projection of the artificial agent's position in 3D onto 2D images (using projection matrices available from the image acquisition). While the start and target positions in framework 300 is shown as 2D heatmaps 302-B and 304-B and the current position of the artificial agent is shown as 2D heatmaps 302-A and 304-A, it should be understood that the start and target position and the current position may be represented using any suitable form.

In a possible embodiment, one or more of the image view sets (e.g., image view sets 302 and/or 304) may alternatively or additionally include other features of the one or more 2D medical images. For example, one or more of the image view sets may include a vesselness image representing a pixelwise probability that a pixel represents a vessel, an intensity image representing a pixelwise intensity values, one or more orientation images representing a pixelwise probability that a vessel in a pixel is orientated in a respective orientation (e.g., vertical, horizontal, a diagonal formed between a lower left corner and an upper right corner, or a diagonal formed between an upper left corner to a lower right corner), branch overlapping scores representing pixelwise scores that the pixel is an overlapping branch, key point detections (e.g., bifurcations), etc.

At step 204, policy values are calculated for a plurality of actions for moving the artificial agent in 3D based on the current state observation using a trained machine learning model. The current state observation is input into the trained machine learning model and policy values for the plurality of actions are calculated based on the current observation state using the trained machine learning model. The policy values may be action-values (where the artificial agent is trained with deep reinforcement learning using Q-learning), probabilities (where the artificial agent is trained with deep reinforcement learning using policy gradient methods), or any other suitable policy value. Framework 300 shows artificial agent 306 receiving image view sets 302 and 304 for calculating or predicting policy values for the plurality of actions.

Artificial agent 306 is implemented using one or more computers (e.g., computer 602 of FIG. 6) by executing computer program instructions (code) loaded into memory. Artificial agent 306 is trained to perform one of the plurality of actions based on a policy and reward mechanism learned using machine learning, such as, e.g., a deep neural network (DNN). In one embodiment, the artificial agent 306 is trained with deep reinforcement learning during a prior training or offline stage to learn a policy that maps states to actions to maximize a reward. In one embodiment, artificial agent 306 is trained during the training stage as described below with respect to FIG. 5.

The policy values for the plurality of actions are computed by accumulating the rewards of the one or more 2D medical images for each image view set according to the policy. The policy values are computed for each respective action based on the projected position of artificial agent 306 (as would be moved according to the respective action), 2D ground truth centerlines for the one or more 2D medical images, and the start and target positions. In one embodiment, if 3D ground truth centerlines are available (e.g., from CTA), the reward can also be computed in 3D or as a combination of both 2D and 3D rewards.

The plurality of actions are for virtually moving the artificial agent 306 within a 3D space relative to a reference direction. The 3D space has a 3D coordinate system that corresponds to the 2D coordinate system of the one or more 2D medical images. In one embodiment, the plurality of actions are discrete movements (i.e., predetermined movements or a finite set of movements in particular directions). For example, the plurality of actions may include discrete movements, relative to a reference direction, in a forward direction, a backward direction, a left direction, a right direction, an upwards direction, and a downwards direction. Movements in other directions are also contemplated (e.g., diagonal). In another embodiment, e.g., depending on the method of reinforcement learning being implemented, the plurality of actions are continuous movements (i.e., movements in any direction, relative to a reference direction, within a range (e.g., a 360 degree range)). The plurality of actions are defined during the training stage.

At step 206, the artificial agent is moved according to a particular action, of the plurality of actions, based on the policy values for the plurality of actions. For example, the artificial agent may be moved for the particular action that has the highest policy value (e.g., highest action-value). The movement of the artificial agent is a virtual movement in a 3D space accomplished in memory or other circuitry/hardware of a computer system.

At step 208, it is determined whether a stopping condition is satisfied. For example, the stopping condition may be that the current position of the artificial agent 306 is the target position or a maximum number of iterations has been performed. Any other suitable stopping condition may also be employed. If the stopping condition is not satisfied, method 200 returns to step 202 and the determining (step 202), the calculating (step 204), and the moving (step 206) steps are repeated to incrementally move the artificial agent to form a 3D path within the 3D space between the start position and the target position. Accordingly, steps 202, 204, and 206 are iteratively repeated until the stopping condition is satisfied. During each iteration, only the current position of the artificial agent is updated in each image view set to determine the current state observation, as shown in framework 300, and the one or more 2D medical images, the start position, and the target position (and any other input) in each image view set remain unchanged. When the stopping condition is satisfied, method 200 proceeds to step 210.

At step 210, a 3D centerline of the vessel is determined as the 3D path of the artificial agent. In one embodiment, the 3D centerline of the vessel (and the 3D path of the artificial agent) is represented by a set of 3D coordinates, each representing the incremental movement of the artificial agent in the 3D space, between the start position and the target position.

At step 212, a 2D centerline of the vessel is determined based on the 3D centerline of the vessel. In one embodiment, the 2D centerline of the vessel is determined by projecting the 3D centerline of the vessel into a 2D space or view. The 2D centerline of the vessel is represented by a set of 2D coordinates, each representing incremental movement of the artificial agent in the 2D space, between the start position and the target position.

At step 214, the 3D centerline and/or 2D centerline of the vessel is output. For example, the 3D centerline and/or 2D centerline of the vessel can be output by displaying the 3D centerline and/or 2D centerline of the vessel on a display device of a computer system (e.g., computer 602 of FIG. 6), storing the 3D centerline and/or 2D centerline of the vessel on a memory or storage of a computer system (e.g., computer 602 of FIG. 6), or by transmitting the 3D centerline and/or 2D centerline of the vessel to a remote computer system. In one embodiment, the 2D centerline is displayed on a display device overlaid on the one or more 2D medical images. Although the final 3D centerline and/or 2D centerline of the vessel is output in method 200, it is also possible that the incremental 3D centerline and/or 2D centerline of the vessel (from the incremental 3D path of the artificial agent) can be output (e.g., displayed on a display of a computer system) as each iteration of steps 202-212. Such incremental results would allow, for example, a user to view the 3D and/or 2D path of the artificial agent in real-time as the artificial agent moves.

Figure 4:
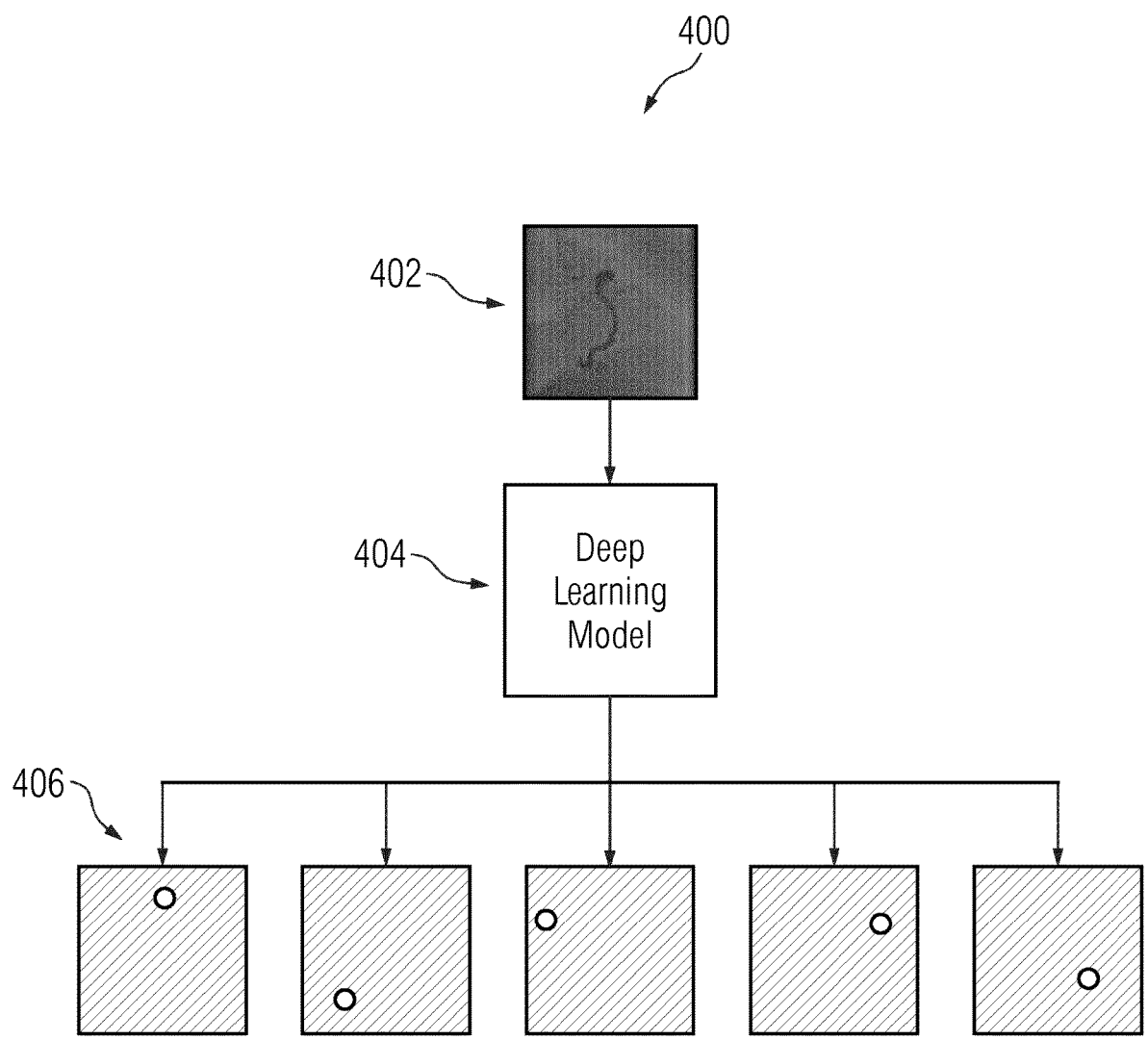
FIG. 4 shows a high-level framework for detecting distal points of a vessel tree.

In one embodiment, method 200 may be applied to extract a centerline for a full vessel tree. One proximal point and a plurality of distal points are determined for the vessel tree. In one embodiment, the proximal point and the plurality of distal points are manually identified by a user. In another embodiment, a deep learning network, such as, e.g., multi-object deep convolutional neural network, can be used to automatically detect the proximal point and the plurality of distal points of the vessel tree. For example, FIG. 4 shows a high-level framework 400 for detecting distal points of a tree vessel using a deep learning model, in accordance with one or more embodiments. A medical image 402 depicting a vessel tree is input into a trained deep learning model 404 (e.g., a multi-object deep convolutional neural network trained using known methods), which generates a plurality of heatmaps 406 indicating locations of the proximal point and distal points of the vessel tree. Method 200 may be performed for each proximal point-distal point pair (i.e., pairs between the proximal point and each of the plurality of distal points) using the proximal point as the start position and the respective distal point as the target position to determine a 3D centerline for the full vessel tree. In some embodiments, where the vessel tree has one or more branches (e.g., bifurcations or trifurcations), the artificial agent can continue along one of the branches and one or more additional artificial agents can be created as an action to move along the other branches.

In one embodiment, framework 300 may be modified to determine a 3D centerline of a vessel from a single image view set (e.g., image view set 302 or 304). In particular, framework 300 may be modified such that the single image view set includes the time of arrival of a contrast agent at particular points along the vessel (between the start position and the target position) and a blood flow velocity or contrast agent propagation speed at particular points along the vessel. Accordingly, the artificial agent learns to move in 3D space so that its traveled distance is consistent with the estimated 3D position of each of the particular points (e.g., determined based on the time of arrival of the contrast agent or the blood flow velocity or contrast agent propagation speed at the particular points), while ensuring that the 3D path of the artificial agent projected in 2D matches the image features of the single image view set.

In one embodiment, the time of arrival of the contrast agent may be determined as the acquisition time of the frame in which the contrast agent arrives at a particular point along the vessel minus the acquisition time of the frame in which the contrast agent arrives at the start position. Any other suitable method for determining the time of arrival of the contrast agent may also be employed.

In one embodiment, blood flow velocity and contrast agent propagation speed can be determined from the one or more 2D medical images. For example, given a start position and a target position on the vessel, the time required for propagating a contrast agent (e.g., a front of the contrast agent) from the start position to the target position can be estimated based on the frame count. Accordingly, given a distance between the start position and the target position (e.g., determined based on the 3D reconstruction of the vessel), contrast agent propagation speed can be approximated as the ratio between the distance and the time required for blood flow propagation. Alternatively, given an estimation of blood flow velocity or contrast agent propagation speed, the distance between two points (e.g., the start position and the target position) can be estimated using the blood flow propagation time. In other embodiments, blood flow velocity and contrast agent propagation speed can be determined based on, e.g., population-averaged values (e.g., depending on the location on the coronary tree and subject characteristics), direct measurements either invasively (e.g., intravascular Doppler) or non-invasively (e.g., Doppler or phase contrasted MRI), or estimated using physiological modeling as described in U.S. Pat. No. 9,918,690, filed Oct. 7, 2015, entitled "Synthetic Data-Driven Hemodynamic Determination in Medical Imaging," the disclosure of which is incorporated herein by reference in its entirety. Any other suitable method for determining blood flow velocity or contrast agent propagation speed may also be employed.

Figure 5:
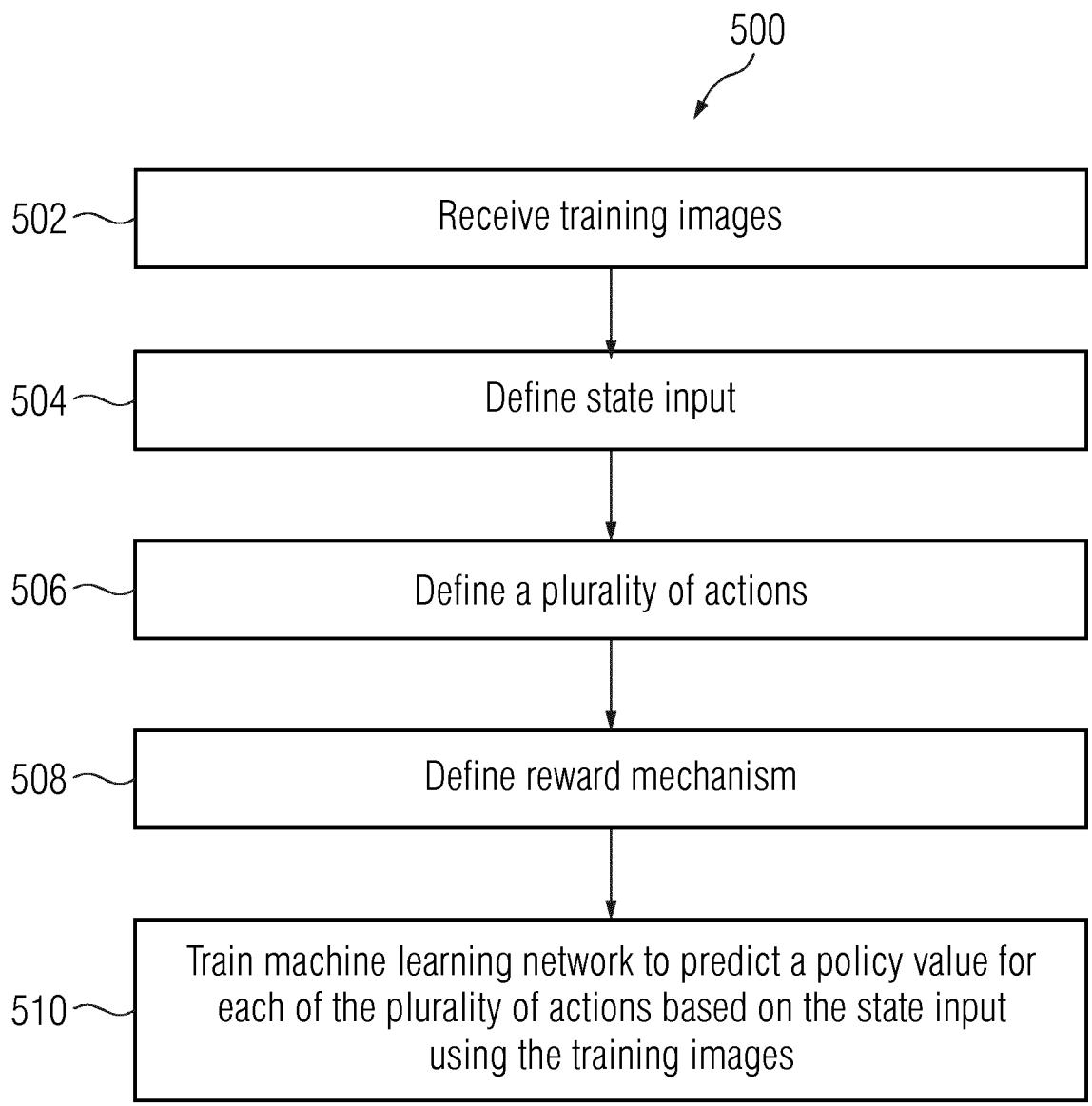
FIG. 5 shows a method for training an artificial agent for determining a 3D centerline of a vessel.

FIG. 5 shows a method 500 for training an artificial agent for determining a 3D centerline of a vessel, in accordance with one or more embodiments. Method 500 may be performed by any suitable computing device, such as, e.g., computer 602 of FIG. 6. Method 500 is performed during an offline or training stage to train the artificial agent. The trained artificial agent may be applied during an online or testing stage, e.g., in method 200 of FIG. 2.

At step 502, training images are received. In one embodiment, the training images may be include training medical images of vessels with ground truth centerlines of the vessels. The training medical images may be of any suitable modality, may be of the same modality or different modalities, and may be acquired from a same patient at different times or different patients. The training medical images can include actual medical images of patients acquired from medical image acquisition devices. These training medical images can be obtained by receiving the images from the image acquisition devices used to acquire the images or by loading previously acquired images from a storage or memory of a computer system. The ground truth centerline for these training medical images can be acquired by manual expert annotation or by applying an existing image centerline tracing method. The training medical images can also include synthetic images. The synthetic images may be generated using any suitable approach.

In one embodiment, the synthetic images are generated by synthetically generating anatomical models of the arterial tree to provide ground truth centerlines. The anatomical models of the arterial trees may be generated according to methods described in U.S. Pat. No. 9,918,690, filed Oct. 7, 2015, the disclosure of which is incorporated herein by reference in its entirety. Blood flow and contrast agent propagation are then simulated using physiological models with different settings (e.g., heart rate values, contrast agent injection rates, etc.). Synthetic coronary angiograms are generated by projecting the time-resolved results of the simulation onto one or more planes representing the position of the sensor of the imaging scanner.

In another embodiment, the synthetic images are generated by forward projecting coronary segmentations from single or multi-phase CTA volumes on to multiple 2D views. In order to mimic motion of the heart, a prior motion model can be applied to structures of the heart (e.g., the four chambers) segmented in the CTA images to deform the coronary segmentations.

At step 504, the state input to a machine learning model is defined for the task of determining a 3D centerline of a vessel for which the machine learning model is being trained. The state that is input to the machine learning model is the one or more 2D medical images of a vessel, a current position of the artificial agent in the one or more 2D medical images, and a start position and a target position in the one or more 2D medical images. The state may also include other inputs, such as, e.g., the time of arrival of a contrast agent, the blood flow velocity, the contrast agent propagation speed, etc.

At step 506, the plurality of actions are defined. The plurality of actions represent the set of possible actions for moving the artificial agent. For example, the plurality of actions may include discrete movements in the forward, backward, left, right, up, and down directions. Other actions are also contemplated (e.g., diagonal). In some embodiments, the plurality of actions may be continuous movements in any direction.

At step 508, a reward mechanism is defined. The reward mechanism assigns a reward for each of the plurality of actions depending on the effect of that action on the trajectory of the path of the artificial agent. A higher reward is assigned for actions that lead to a more accurate centerline of the vessel.

At step 510, the machine learning model is trained to predict a policy value for each of the plurality of actions based on the state input using the training images. The policy value for an action represents the overall reward that is expected if that action is performed. The policy value may be any suitable value defining an action space, e.g., depending on the method used for training the machine learning model. For example, in deep reinforcement learning using Q-learning, the policy value is an action-value. In deep reinforcement learning using policy gradient methods, the policy value is a probability over an action state given the input state. The machine learning model may be any suitable machine learning based model, such as, e.g., a deep neural network. The artificial agent is implemented by the machine learning model which takes the state as input and outputs policy values for each of the plurality of actions.

In one embodiment, the deep neural network can be trained with deep reinforcement learning. Reinforcement Learning is a type of machine learning in which a software based artificial agent uses reward feedback to automatically learn ideal behavior in a specific context and for a specific task. In deep reinforcement learning, which combines deep neural networks with reinforcement learning, a policy learning process is formulated as a reinforcement learning problem and an action-value function is estimated following the Bellman equation as an iterative update. In deep reinforcement learning (and reinforcement learning), the training of the artificial agent is typically unguided and the artificial agent is free to evolve in its environment according to its current policy estimate.

In one embodiment, the deep neural network can be trained with deep reinforcement learning using Q-learning. In Q-learning, the deep neural network is trained to predict action-values for each of the plurality of actions. In another embodiment, the deep neural network can be trained with deep reinforcement learning using the policy gradient method. With the policy gradient method, the deep neural network is trained to predict a probability of taking each of the plurality of actions. Deep reinforcement learning can be implemented with any other suitable approach.

The trained machine learning model is stored, for example, in memory or storage of a computer system or on a remote cloud-based computer system. The trained machine learning model can then be loaded and used to determine a 3D centerline of a vessel by iteratively predicting policy values for each of the plurality of actions based on the current state and executing the selected action having the optimal policy value (e.g., highest predicted action-value).

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 2 and 5. Certain steps or functions of the methods and workflows described herein, including one or more of the steps or functions of FIGS. 2 and 5, may be performed by a server or by another processor in a network-based cloud-computing system. Certain steps or functions of the methods and workflows described herein, including one or more of the steps of FIGS. 2 and 5, may be performed by a client computer in a network-based cloud computing system. The steps or functions of the methods and workflows described herein, including one or more of the steps of FIGS. 2 and 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 2 and 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
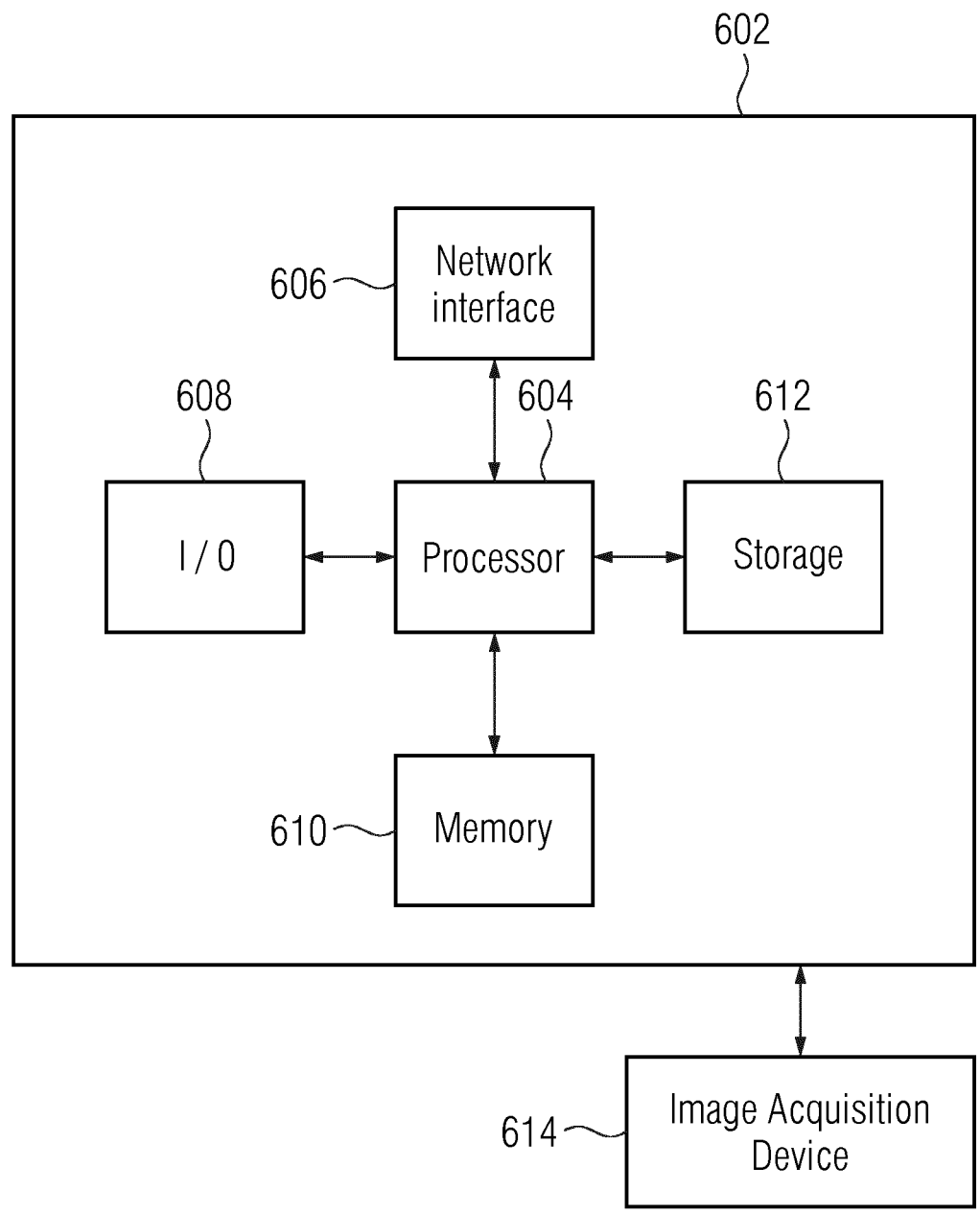
FIG. 6 shows a high-level block diagram of a computer.

A high-level block diagram of an example computer 602 that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIGS. 2 and 5 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIGS. 2 and 5. Accordingly, by executing the computer program instructions, the processor 604 executes the method and workflow steps or functions of FIGS. 2 and 5. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

An image acquisition device 614 can be connected to the computer 602 to input image data (e.g., medical images) to the computer 602. It is possible to implement the image acquisition device 614 and the computer 602 as one device. It is also possible that the image acquisition device 614 and the computer 602 communicate wirelessly through a network. In a possible embodiment, the computer 602 can be located remotely with respect to the image acquisition device 614.

Any or all of the systems and apparatus discussed herein may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining a 3D centerline of a vessel in one or more two dimensional (2D) medical images, comprising:
   determining a current state observation of an artificial agent based on one or more image view sets each comprising one or more 2D medical images of a vessel, a current position of the artificial agent in the one or more 2D medical images, and a start position and a target position in the one or more 2D medical images;
   calculating policy values for a plurality of actions for moving the artificial agent in three dimensions (3D) based on the current state observation using a trained machine learning model;
   moving the artificial agent according to a particular action, of the plurality of actions, based on the policy values;
   repeating the determining, the calculating, and the moving steps for a plurality of iterations to move the artificial agent along a 3D path between the start position and the target position; and
   determining a 2D centerline of the vessel as the 3D path.

2. The method of claim 1, further comprising:
   determining (212) a 2D centerline of the vessel based on the 3D centerline of the vessel.

3. The method of claim 1, wherein repeating the determining, the calculating, and the moving steps for a plurality of iterations to move the artificial agent along a 3D path between the start position and the target position comprises:
   repeating the determining, the calculating, and the moving steps until the current position of the artificial agent is the target position or a maximum number of iterations has been performed.

4. The method of claim 1, wherein the plurality of actions comprises discrete movements in a forward direction, a backward direction, a left direction, a right direction, an upwards direction, and a downwards direction.

5. The method of claim 1, wherein the plurality of actions comprises continuous movements in any direction.

6. The method of claim 1, wherein at least one of the one or more image view sets further comprises at least one of a vesselness image, an intensity image, one or more orientation images, branch overlapping scores, and key point detections.

7. The method of claim 1, wherein the one or more image view sets is a single image view set comprising a time of arrival of a contrast agent and blood flow velocity or contrast agent propagation speed.

8. The method of claim 1, wherein calculating policy values for a plurality of actions for moving the artificial agent in three dimensions (3D) based on the current state observation using a trained machine learning model comprises:
   calculating the policy values for the plurality of actions based on the current state observation using a trained deep neural network (DNN) trained using deep reinforcement learning.

9. The method of claim 1, further comprising:
   detecting a proximal point and a plurality of respective distal points in a vessel tree; and
   performing the determining the current state observation, the calculating, the moving, the repeating, and the determining the 3D centerline of the vessel for each proximal point-distal point pair using the proximal point as the start position and the respective distal point as the target position to determine a 3D centerline of the vessel tree.

10. The method of claim 1, wherein the one or more 2D medical images of the vessel are channels of an angiographic x-ray image.

11. An apparatus for determining a 3D centerline of a vessel in one or more two dimensional (2D) medical images, comprising:
    means for determining a current state observation of an artificial agent based on one or more image view sets each comprising one or more 2D medical images of a vessel, a current position of the artificial agent in the one or more 2D medical images, and a start position and a target position in the one or more 2D medical images;
    means for calculating policy values for a plurality of actions for moving the artificial agent in three dimensions (3D) based on the current state observation using a trained machine learning model;
    means for moving the artificial agent according to a particular action, of the plurality of actions, based on the policy values;
    means for repeating the determining, the calculating, and the moving steps for a plurality of iterations to move the artificial agent along a 3D path between the start position and the target position; and
    means for determining a 3D centerline of the vessel as the 3D path.

12. The apparatus of claim 11, further comprising:
    means for determining a 2D centerline of the vessel based on the 3D centerline of the vessel.

13. The apparatus of claim 11, wherein the means for repeating the determining, the calculating, and the moving steps for a plurality of iterations to move the artificial agent along a 3D path between the start position and the target position comprises:
    means for repeating the determining, the calculating, and the moving steps until the current position of the artificial agent is the target position or a maximum number of iterations has been performed.

14. The apparatus of claim 11, wherein at least one of the one or more image view sets further comprises at least one of a vesselness image, an intensity image, one or more orientation images, branch overlapping scores, and key point detections.

15. A non-transitory computer readable medium storing computer program instructions, the computer program instructions when executed by a processor cause the processor to perform operations comprising:
    determining a current state observation of an artificial agent based on one or more image view sets each comprising one or more two dimensional (2D) medical images of a vessel, a current position of the artificial agent in the one or more 2D medical images, and a start position and a target position in the one or more 2D medical images;
    calculating policy values for a plurality of actions for moving the artificial agent in three dimensions (3D) based on the current state observation using a trained machine learning model;
    moving the artificial agent according to a particular action, of the plurality of actions, based on the policy values;
    repeating the determining, the calculating, and the moving steps for a plurality of iterations to move the artificial agent along a 3D path between the start position and the target position; and
    determining a 3D centerline of the vessel as the 3D path.

16. The non-transitory computer readable medium of claim 15, wherein the plurality of actions comprises discrete movements in a forward direction, a backward direction, a left direction, a right direction, an upwards direction, and a downwards direction.

17. The non-transitory computer readable medium of claim 15, wherein the plurality of actions comprises continuous movements in any direction.

18. The non-transitory computer readable medium of claim 15, wherein the one or more image view sets is a single image view set comprising a time of arrival of a contrast agent and blood flow velocity or contrast agent propagation speed.

19. The non-transitory computer readable medium of claim 15, the operations further comprising:
    detecting a proximal point and a plurality of respective distal points in a vessel tree; and
    performing the determining the current state observation, the calculating, the moving, the repeating, and the determining the 3D centerline of the vessel for each proximal point-distal point pair using the proximal point as the start position and the respective distal point as the target position to determine a 3D centerline of the vessel tree.

20. The non-transitory computer readable medium of claim 15, wherein the one or more 2D medical images of the vessel are channels of an angiographic x-ray image.

* * * * *